United States Patent
Yoda et al.

(10) Patent No.: US 6,823,406 B2
(45) Date of Patent: Nov. 23, 2004

(54) MICROPROCESSOR EXECUTING A PROGRAM TO GUARANTEE AN ACCESS ORDER

(75) Inventors: Hitoshi Yoda, Kawasaki (JP); Hiroyuki Utsumi, Kawasaki (JP); Yasuhiro Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 292 days.

(21) Appl. No.: 10/095,568

(22) Filed: Mar. 13, 2002

(65) Prior Publication Data

US 2003/0018854 A1 Jan. 23, 2003

(30) Foreign Application Priority Data

Jul. 17, 2001 (JP) ........................................ 2001-216223

(51) Int. Cl.[7] .............................................. G06F 13/14
(52) U.S. Cl. ........................... 710/52; 710/39; 712/207; 712/237
(58) Field of Search ............................. 710/36, 39, 40, 710/52, 54, 240, 244; 711/167, 168, 213; 712/23, 207, 212, 237, 239, 240, 245

(56) References Cited

U.S. PATENT DOCUMENTS

| 5,467,473 A | * | 11/1995 | Kahle et al. .................. 712/23 |
| 5,475,823 A | | 12/1995 | Amerson et al. |
| 5,666,494 A | * | 9/1997 | Mote, Jr. ...................... 711/167 |
| 5,737,636 A | * | 4/1998 | Caffo et al. .................... 710/54 |
| 6,006,325 A | | 12/1999 | Burger et al. |
| 6,079,012 A | | 6/2000 | Morris et al. |
| 6,148,394 A | | 11/2000 | Tung et al. .................. 712/218 |
| 6,266,767 B1 | * | 7/2001 | Feiste et al. ................. 712/217 |
| 6,266,768 B1 | * | 7/2001 | Frederick. et al. ........... 712/220 |

FOREIGN PATENT DOCUMENTS

| JP | 11-249959 | 9/1999 |
| WO | WO 99/08184 | 2/1999 |

* cited by examiner

Primary Examiner—B. James Peikari
(74) Attorney, Agent, or Firm—Staas & Halsey LLP

(57) ABSTRACT

A microprocessor includes a register and a comparator. The register stores an address area, the address area requiring a guarantee of an access order. The comparator compares an address of the address area held in said register with an address of an address area indicated in an access request from CPU, and outputs a signal to execute an access request succeeding the access request from the CPU after executing an access request preceding the access request from the CPU when the address area indicated in the access request from the CPU matches the address area held in said register.

8 Claims, 21 Drawing Sheets

FIG.18

```
st   4,@(5,6)          ————— STORE INSTRUCTION TO TCTR (WRITE)
ld   @(7,8),9          ————— LOAD INSTRUCTION TO TCSR (READ)
         ↓
st   4,@(5,6)
membar                 ————— INSTRUCTION FOR WAITING FOR
ld   @(7,8),9                COMPLETION OF EXECUTION OF
                             LOAD/STORE INSTRUCTION
```

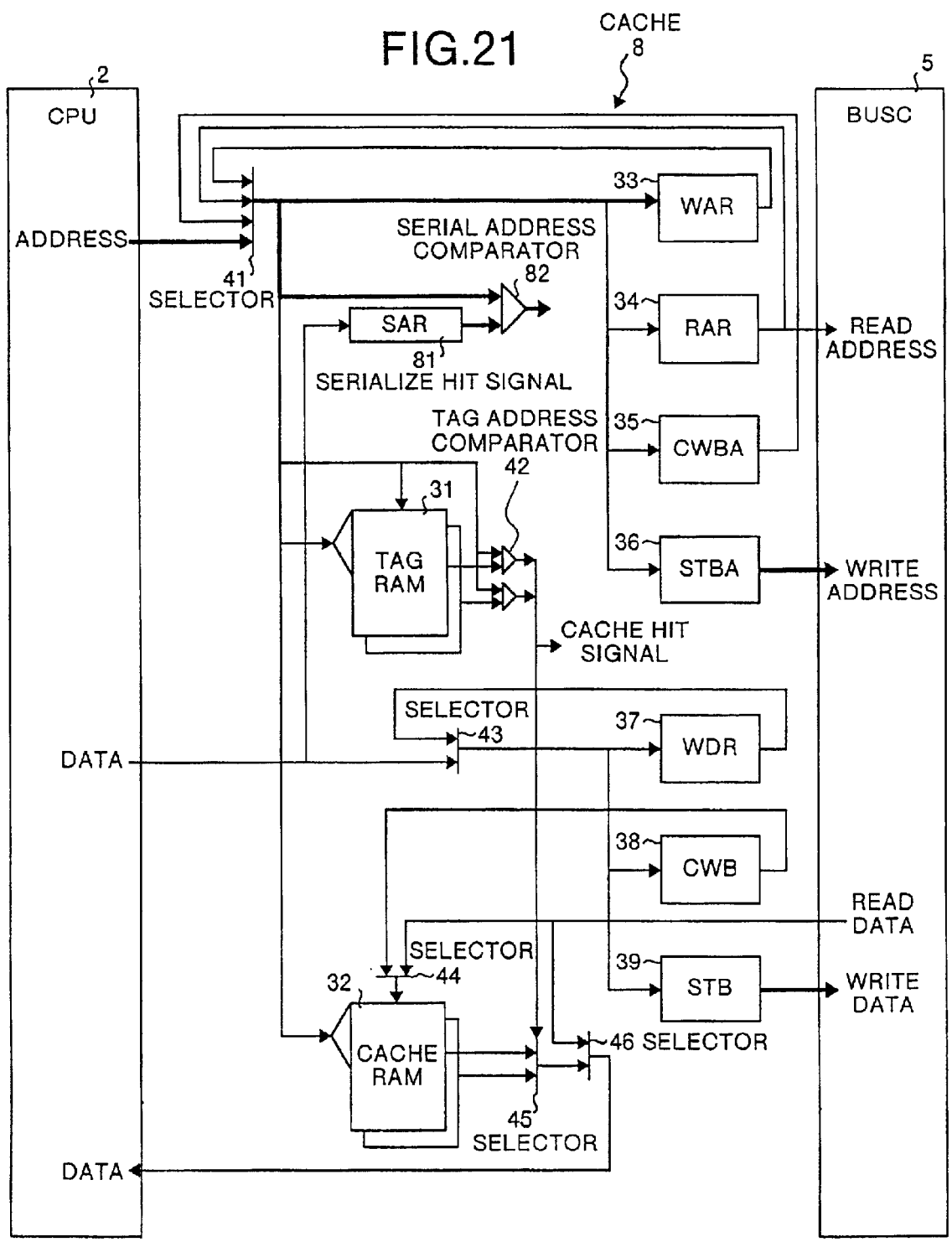

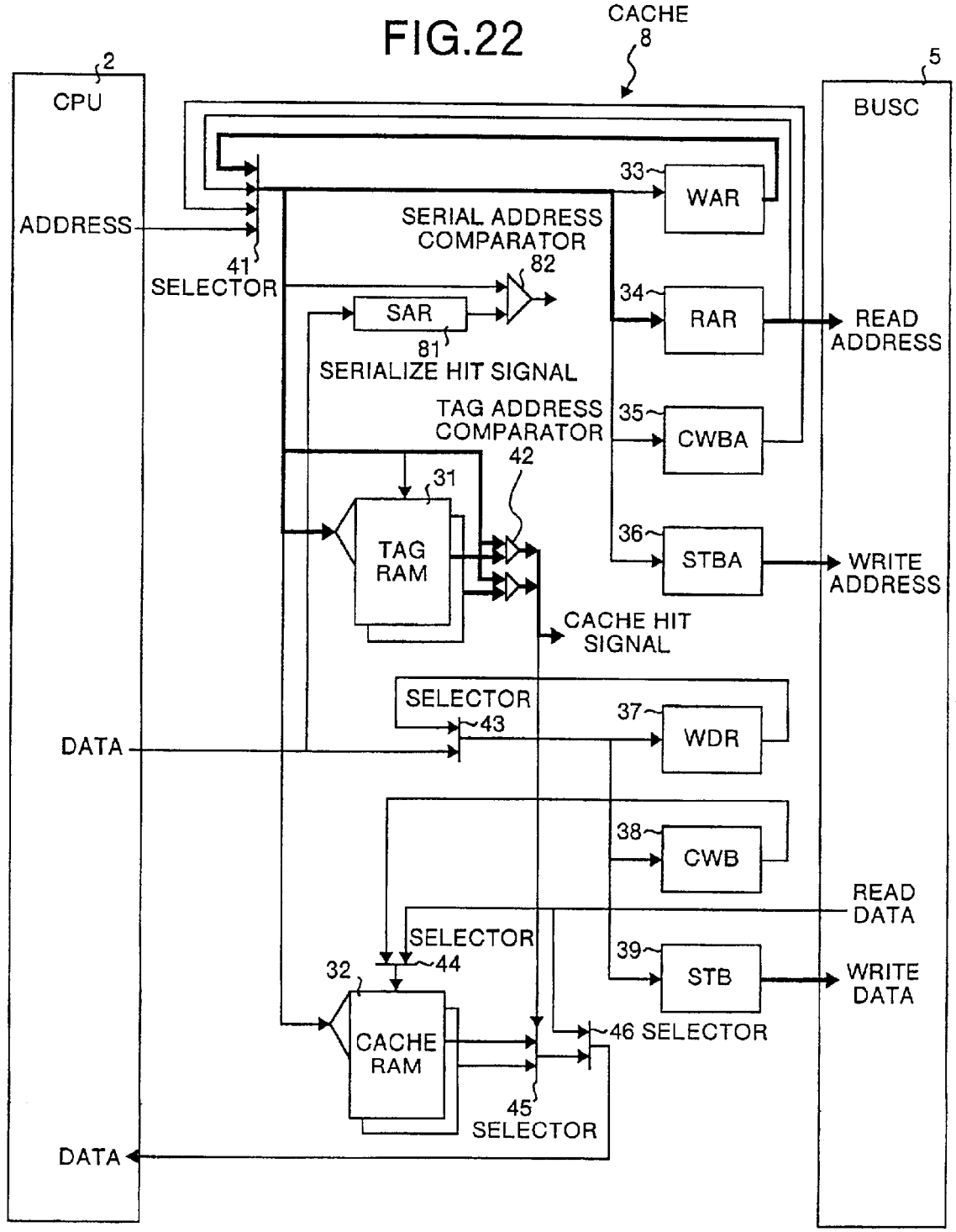

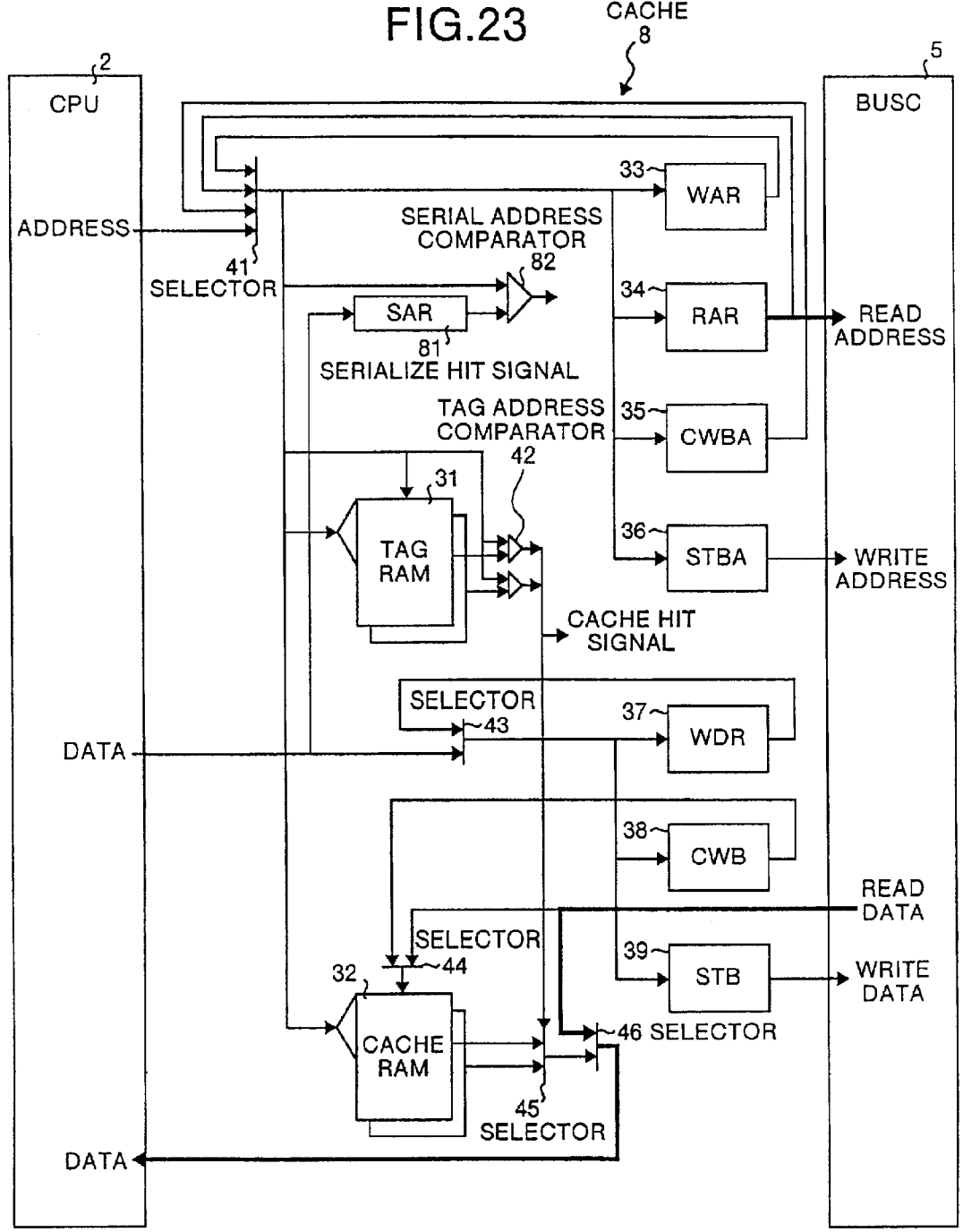

MICROPROCESSOR EXECUTING A PROGRAM TO GUARANTEE AN ACCESS ORDER

FIELD OF THE INVENTION

The present invention relates to a microprocessor executing a program by replacing an order of read and write.

BACKGROUND OF THE INVENTION

A microprocessor, such as an image processing processor, occasionally executes a program by replacing an order of read and write. Such a microprocessor executes instructions by replacing the order of a read instruction and a write instruction that have been issued from a central processing unit ("CPU") to a main memory or a peripheral system, according an order of a program, in order to improve a processing performance. According to this kind of microprocessor, when the CPU accesses a register, such as a control register in the peripheral system, but the meaning is different depending on the order of the access, it is necessary to guarantee an access order.

In general, the CPU carries out a processing (operation) by accessing a machine instruction or data that is stored in the main memory. However, because an operation speed of the main memory is extremely lower than that of the CPU, it takes a long processing time to read from and to write to the main memory. Therefore, a cache memory that operates at a higher speed than the main memory is provided between the CPU and the main memory. The instruction or data is temporarily stored in the cache memory, to reduce access to the main memory. Based on this arrangement, a processing time required for read and write is reduced.

FIG. 1 is a schematic diagram that shows an outline of a flow of the data when the CPU writes the data into the main memory. A microprocessor 1 has a CPU 2 and a cache system 3. The CPU 2 outputs a write data and a write address data (hereinafter, an address data will be simply referred to as an address) to the cache system 3. The write data and the write address are sent to a main memory 6 via a bus control section ("BUSC") 5, and are written into the main memory 6. The solid black arrows in FIG. 1 show the flow of data when the CPU writes the data into the main memory.

FIG. 2 is a schematic diagram that shows an outline of a flow of data when the CPU 2 reads the data from the main memory 6. The CPU 2 outputs an address of the data to be read, that is, a read address, to the cache system 3. The read address is sent to the main memory 6 via the bus control section 5. The main memory 6 reads the data corresponding to the read address. The read data is sent to the CPU 2 via the bus control section 5 and the cache system 3. The solid black arrows in FIG. 2 show the flow of data when the CPU reads the data from the main memory 6.

FIG. 3 is a schematic diagram that shows another outline of the flow of the data when the CPU 2 writes the data into a peripheral system 7. The CPU 2 outputs the write data and the write address to the cache system 3. The write data and the write address are sent to the peripheral system 7, via the bus control section 5, and are written into a control register or the like. The solid black arrows in FIG. 3 show the flow of the data when the CPU 2 writes the data into the peripheral system 7.

FIG. 4 is a schematic diagram that shows an outline of the flow of the data when the CPU 2 reads the data from the peripheral system 7. The CPU 2 outputs the read address to the cache system 3. The read address is sent to the peripheral system 7 via the bus control section 5. The peripheral system 7 reads the data corresponding to the read address. The read data is sent to the CPU 2 via the bus control section 5 and the cache system 3. The solid black arrows in FIG. 4 show the flow of the data when the CPU 2 reads the data from the peripheral system 7.

FIG. 5 is a block diagram that shows a detailed structure of a cache system of a conventional microprocessor. As shown in FIG. 5, the cache system 3 has a tag RAM 31 that stores an identification address of a cache block, and a cache RAM 32 that stores the data.

The cache system 3 has a wait address register ("WAR") 33, a read address register ("RAR") 34, a cache write buffer address ("CWBA") 35, and a store buffer address ("STBA") 36, as registers that store addresses. Further, the cache system 3 has a wait data register ("WDR") 37, a cache write buffer ("CWB") 38, and a store buffer ("STB") 39, as registers that store data. Further, the cache system 3 has five selectors 41, 43, 44, 45, and 46, and a tag address comparator 42. Further, the cache system 3 has a cache control section not shown that controls the cache system 3.

The operation of the microprocessor shown in FIG. 5 will be explained. FIG. 6 is a diagram that shows the flow of the address and a read data when a read access has a cache hit in the microprocessor shown in FIG. 5. In FIG. 6, thick lines show along which routes the address and the data flow (the same applies to FIG. 7 to FIG. 17, and FIG. 20 to FIG. 23). The CPU 2 supplies a read address to the tag RAM 31 and the cache RAM 32 via the selector 41. The tag address comparator 42 compares a tag address with the read address. When the tag address and the read address coincide with each other as a result of the comparison (cache hit), the CPU 2 receives the data that has been read from a way of the cache RAM 32 in which the addresses coincide, via the selectors 45 and 46. Further, a cache hit signal is asserted.

FIG. 7 is a diagram that shows the flow of the address and the read data when the read access has a cache miss in the microprocessor shown in FIG. 5. The CPU 2 supplies the read address to the tag RAM 31 via the selector 41. The tag address comparator 42 compares the tag address with the read address. When these do not coincide with each other as a result of the comparison (cache miss), the read address is stored into the read address register 34. The stored read address is output to the bus control section 5 together with a read request, until when the read address is accepted by the bus control section 5.

When the bus control section 5 has accepted the read request and the address, and the bus control section 5 has supplied the read data, the read data is sent to the CPU 2 via the selector 46, and the data is also stored into the cache RAM 32 via the selector 44. The cache hit signal is negated. More specifically, the read address is also supplied to the cache RAM 32 from the CPU 32. However, as the cache miss is explained in this case in FIG. 7, a thin line is used to show a section from the selector 41 to the cache RAM 32 instead of a thick line that shows an address supply route (the same applies to FIG. 15).

FIG. 8 is a diagram that shows the flow of the address and the read data when the write access has cache hit in the microprocessor shown in FIG. 5. The CPU 2 supplies a write address to the tag RAM 31 and the cache RAM 32 via the selector 41. The tag address comparator 42 compares the tag address with the write address. When the tag address and the write address coincide with each other as a result of the comparison (cache hit), the write address is stored into the cache write buffer address 35 and the store buffer address 36.

Further, the write data is stored into the cache write buffer 38 and the store buffer 39 via the selector 43. The write address stored in the store buffer address 36 and the write data stored in the store buffer 39 are supplied to the bus control section 5 together with a write request. On the other hand, the write address stored in the cache write buffer address 35 is supplied to the tag RAM 31 and the cache RAM 32. The write data stored in the cache write buffer 38 is written into an area corresponding to the write address of the cache RAM 32. Further, a cache hit signal is asserted.

FIG. 9 is a diagram that shows the flow of the address and the read data when the write access has cache miss in the microprocessor shown in FIG. 5. The CPU 2 supplies a write address to the tag RAM 31 via the selector 41. The tag address comparator 42 compares the tag address with the write address. When the tag address and the write address do not coincide with each other as a result of the comparison (cache miss), the write address is stored into the store buffer address 36. On the other hand, the write data is stored into the store buffer 39 via the selector 43.

The write request, the write address, and the write data are output to the bus control section 5 until the bus control section 5 accepts them. The cache hit signal is negated. More specifically, the write address is also supplied to the cache RAM 32 from the CPU 32. However, as the cache miss is explained in this case, a thin line is used to show a section from the selector 41 to the cache RAM 32 (the same applies to FIG. 20, FIG. 10, and FIG. 14).

Next, the operation will be explained when there is address dependency between write and read when the read access occurs following the write access in the microprocessor shown in FIG. 5. FIG. 10 to FIG. 13 are diagrams that sequentially show flows of an address and data in this case. The CPU 2 makes the write request to the cache system 3, and outputs the write address to the tag RAM 31. The tag address comparator 42 compares the tag address with the write address, and when there is a cache miss as a result of the comparison, the write address and a write data are stored into the store buffer address 36 and the store buffer 39 respectively. Then, the write request is output to the bus control section 5 (refer to FIG. 10).

The CPU 2 makes a read request to the cache system 3. Based on this read request, the read address is compared with the address stored in the store buffer address 36. When these addresses coincide with each other, the read address is stored into the wait address register 33. The read address is stored in the wait address register 33 until a preceding write request is accepted by the bus control section 5 and the operation is completed (refer to FIG. 11).

When the preceding write request has been completed, a succeeding read request is executed again. When the cache miss occurs, the read address is stored into the read address register 34, and the read request and the address are output to the bus control section 5 (refer to FIG. 12). The bus control section 5 accepts the read request, and returns the requested data to the cache system 3. The returned data is output from the cache system 3 to the CPU 2 (refer to FIG. 13). When there is an address dependency between the write access and the read access as explained above, the order of the write request and the read request is not replaced.

Next, the operation of an occasion in which there is no address dependency between write and read when the read access occurs following the write access in the microprocessor shown in FIG. 5, will be explained. FIG. 14 to FIG. 17 are diagrams that sequentially show flows of the address and the data in this case. The CPU 2 makes the write request to the cache system 3, and outputs the write address to the tag RAM 31. The tag address comparator 42 compares the tag address with the write address, and when there is a cache miss as a result of the comparison, the write address and the write data are stored into the store buffer address 36 and the store buffer 39, respectively. Then, the write request is output to the bus control section 5 (refer to FIG. 14).

The CPU 2 makes the read request to the cache system 3, and supplies the read address to the tag RAM 31. The tag address comparator 42 compares the addresses, and when there is a cache miss as a result of this comparison, the read address is stored into the read address register 34. The read request and the address are output to the bus control section 5 until the bus control section 5 accepts them (refer to FIG. 15).

As there is no address dependency between the preceding write request and the succeeding read request, the write request and the read request are output to the bus control section 5 at the same time. Normally, between the read request and the write request, a priority is placed to the read request that has a possibility of being used for the operation by the CPU 2. Therefore, the bus control section 5 first accepts the read request. Then, the bus control section 5 returns the requested data to the cache system 3. The returned data is supplied straight to the CPU 2 (refer to FIG. 16). The bus control section 5 then accepts the write request (refer to FIG. 17). When there is no address dependency between the write access and the read access as explained above, the order of the write request and the read request may be replaced in order to increase the processing capacity.

As explained above, it is not necessary to guarantee the access order to the access that has no address dependency. However, it is necessary to guarantee the access order to the access that is made to a register when the meaning is different depending on the access order, regardless of a presence or an absence of address dependency. For example, after data has been written into a timer control word register (TCTR) provided in the 8254 compatible timer of Intel Corporation, when data of a timer control status register (TCSR0 to 3) having a quite different address is read, the data may change.

In this timer control word register ("TCTR"), data becomes a read back command when a value of a select counter ("SC") 1 or an SC0 is 11. When a value of the timer control status register (TCSR0 to 3) is read when the data is the read back command, the data becomes a status latched count value. On the hand, when a value of the timer control status register (TCSR0 to 3) is read when the data is not the read back command, that is, when a value of the SC1 or the SC0 is not 11, the data becomes a count value at that time.

Therefore, in an occasion of accessing these registers, in order to guarantee the access order, it is necessary to insert an instruction that waits for the completion of a loadistore instruction that has been executed before a main instruction like a "member" instruction, between the access to the timer control word register and the access to the timer control status register (TCSR0 to 3), as shown in FIG. 18, for example. In this case, the access order has conventionally been guaranteed based on software. However, in the compiler, it is difficult to output this kind of code, and therefore, it is necessary to describe a program for manually guaranteeing the access order. As a result, there has been a problem that the programming efficiency is poor.

SUMMARY OF THE INVENTION

It is an object of the present invention to provide a microprocessor that has a structure capable of guaranteeing an access order in hardware.

According to the present invention, the microprocessor is provided with a register which stores an address that requires a guarantee of an access order, and an address comparator which compares the address stored in the register with an address of an access request from a CPU. When the address comparator determines that the two addresses coincide with each other, a preceding access request is executed first, and a succeeding access request is executed after the preceding access request has been executed.

Other objects and features of this invention will become apparent from the following description with reference to the accompanying drawings.

BRIEF DESCRIPTION OF THE DRAWINGS

FIG. 18 is a diagram that shows a part of a program structure for guaranteeing an access order according to conventional software, FIG. 21 is a diagram that shows the flows of the address and the data when the read access occurs following the write access in the microprocessor shown in FIG. 19 (dependency does not exist), in accordance with an aspect of the present invention, FIG. 22 is a diagram that shows the flows of the address and the data when the read access occurs following the write access in the microprocessor shown in FIG. 19 (address dependency does not exist), in accordance with an aspect of the present invention, and FIG. 23 is a diagram that shows the flows of the address and the data when the read access occurs following the write access in the microprocessor shown in FIG. 19 (address dependency does not exist), in accordance with an aspect of the present invention.

DETAILED DESCRIPTIONS

Figure 1:
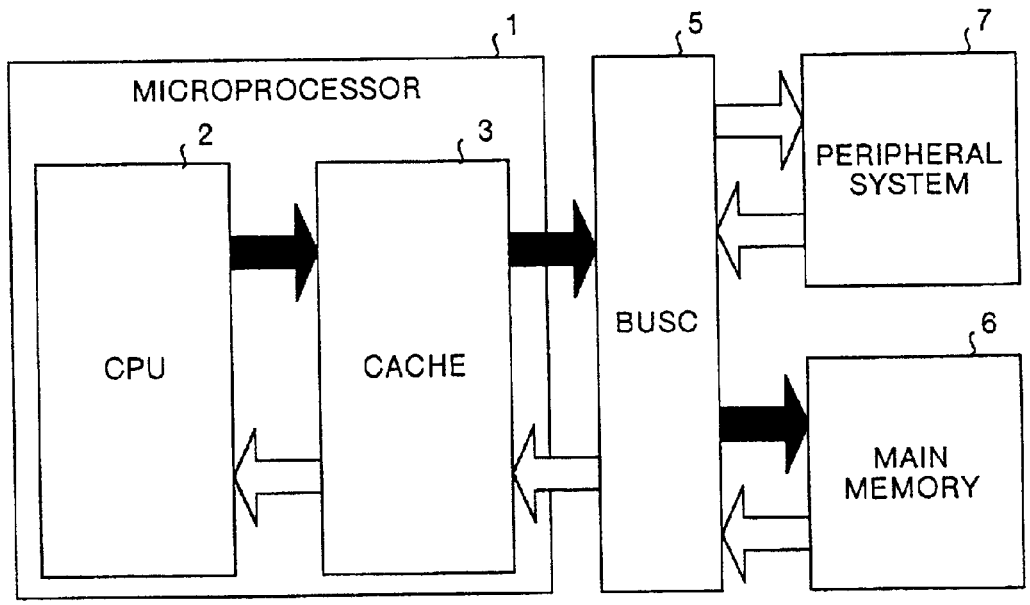
FIG. 1 is a schematic diagram that shows an outline of a flow of data when a CPU writes the data into a main memory.
Figure 2:
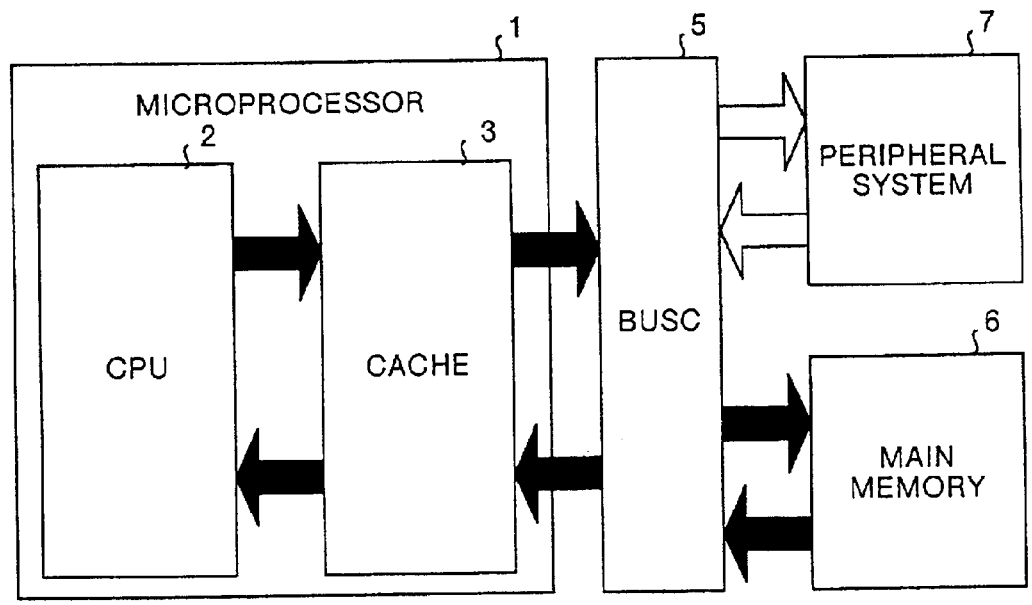
FIG. 2 is a schematic diagram that shows the outline of the flow of the data when the CPU reads the data from the main memory.
Figure 3:
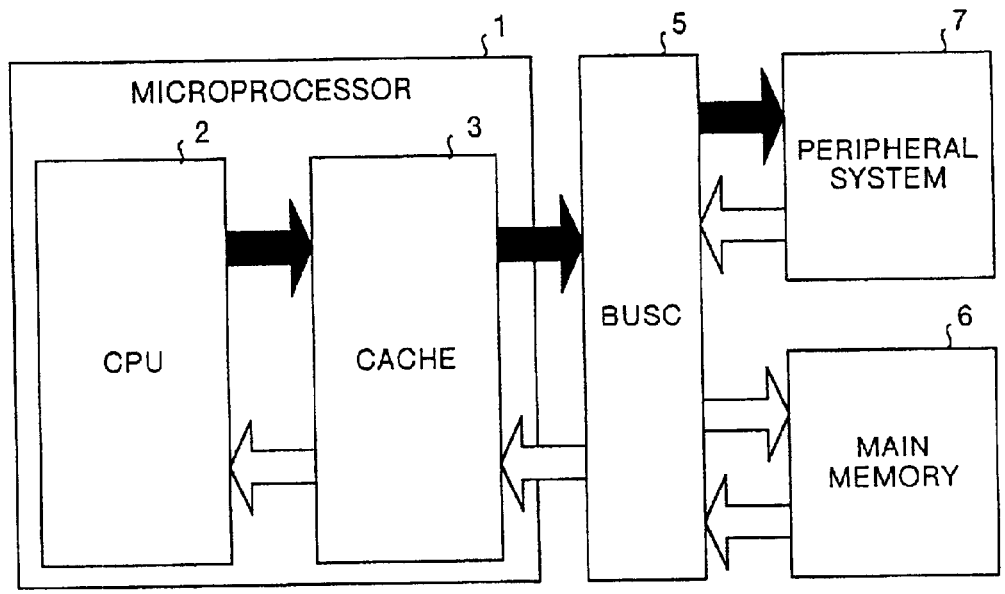
FIG. 3 is a schematic diagram that shows the outline of the flow of the data when the CPU writes the data into a peripheral system.
Figure 4:
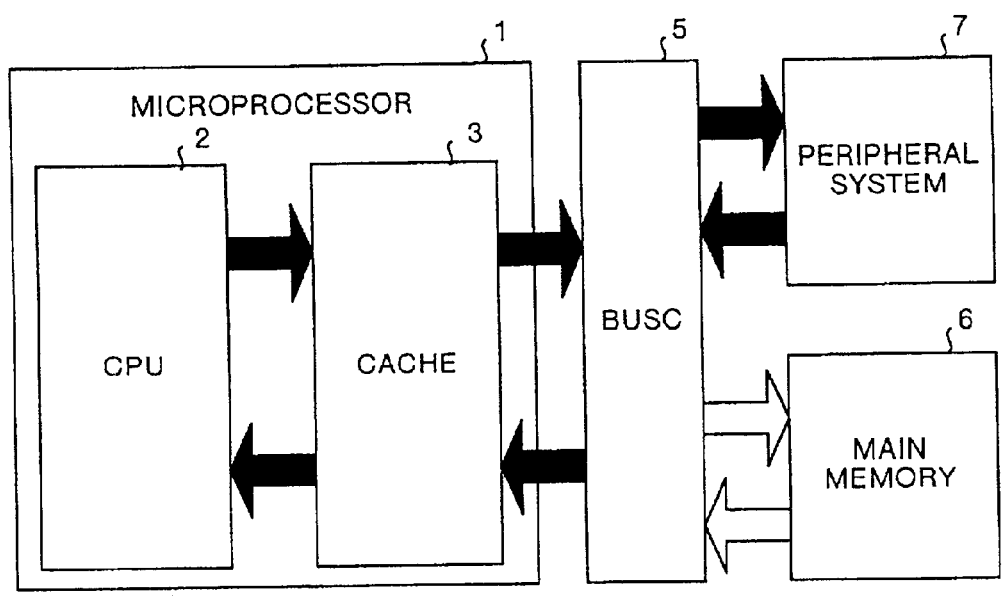
FIG. 4 is a schematic diagram that shows the outline of the flow of the data when the CPU reads the data from the peripheral system.
Figure 5:
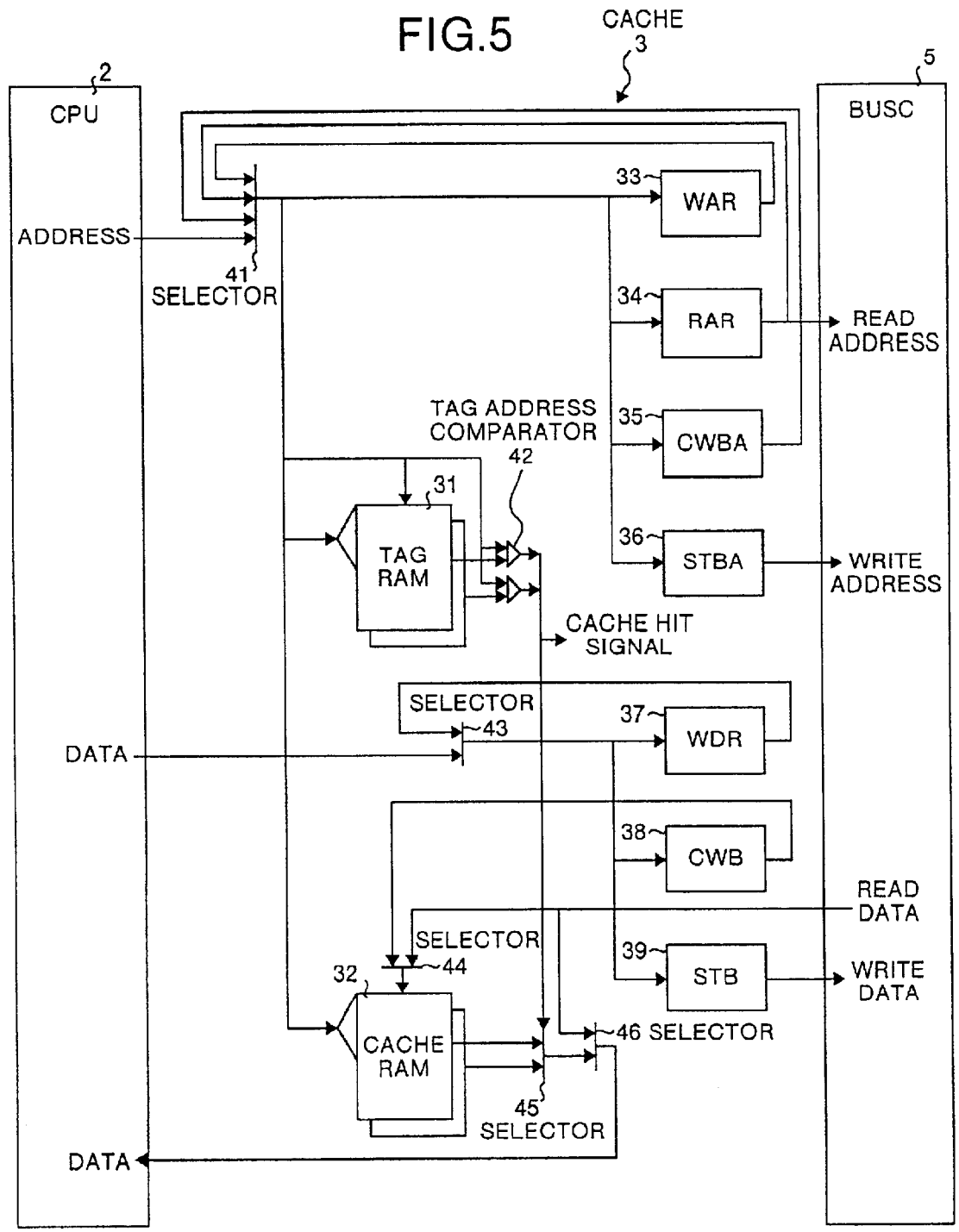
FIG. 5 is a block diagram that shows a detailed structure of a cache system of a conventional microprocessor.
Figure 6:
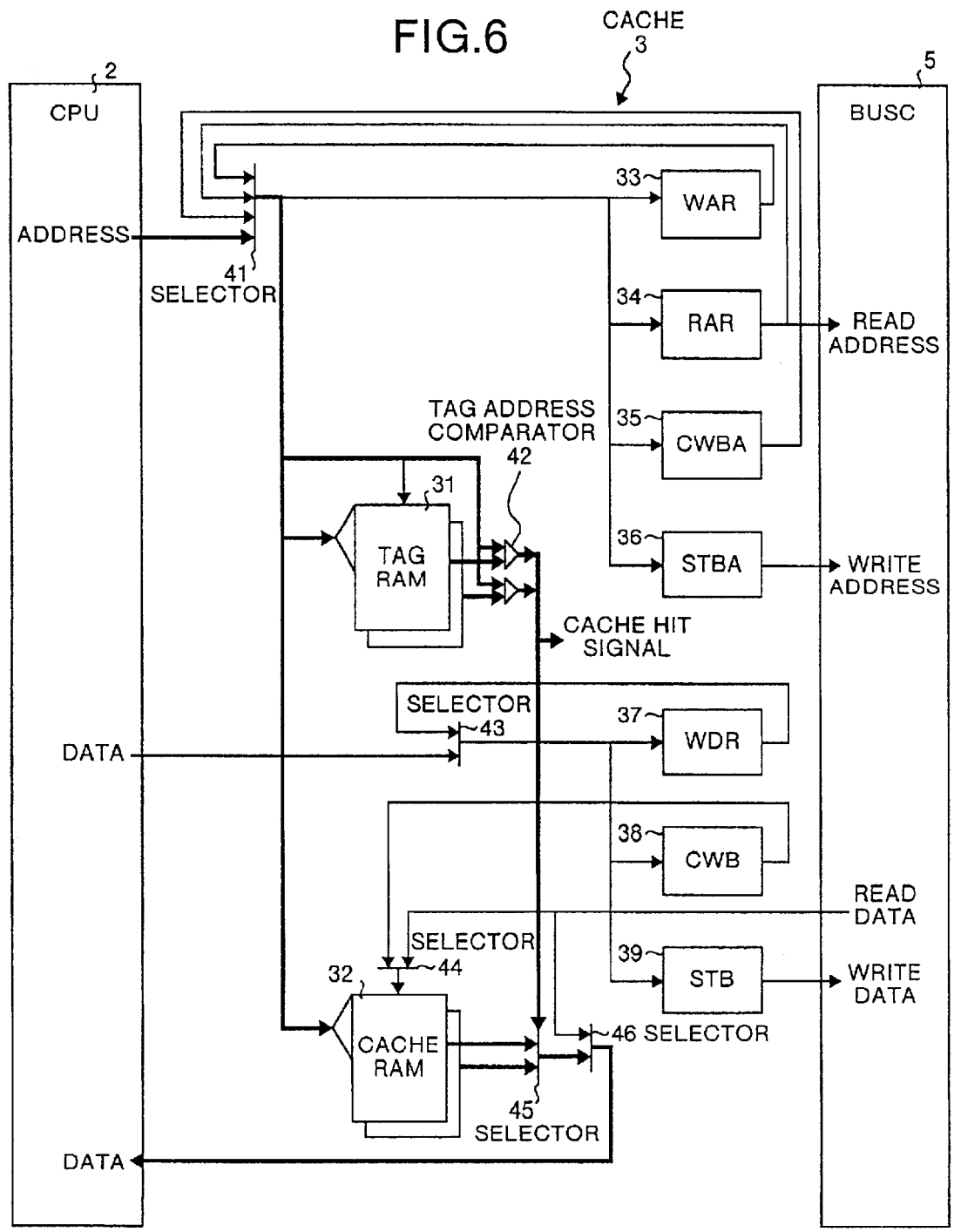
FIG. 6 is a diagram that shows a flow of an address and a read data when a read access has a cache hit in the microprocessor shown in FIG. 5.
Figure 7:
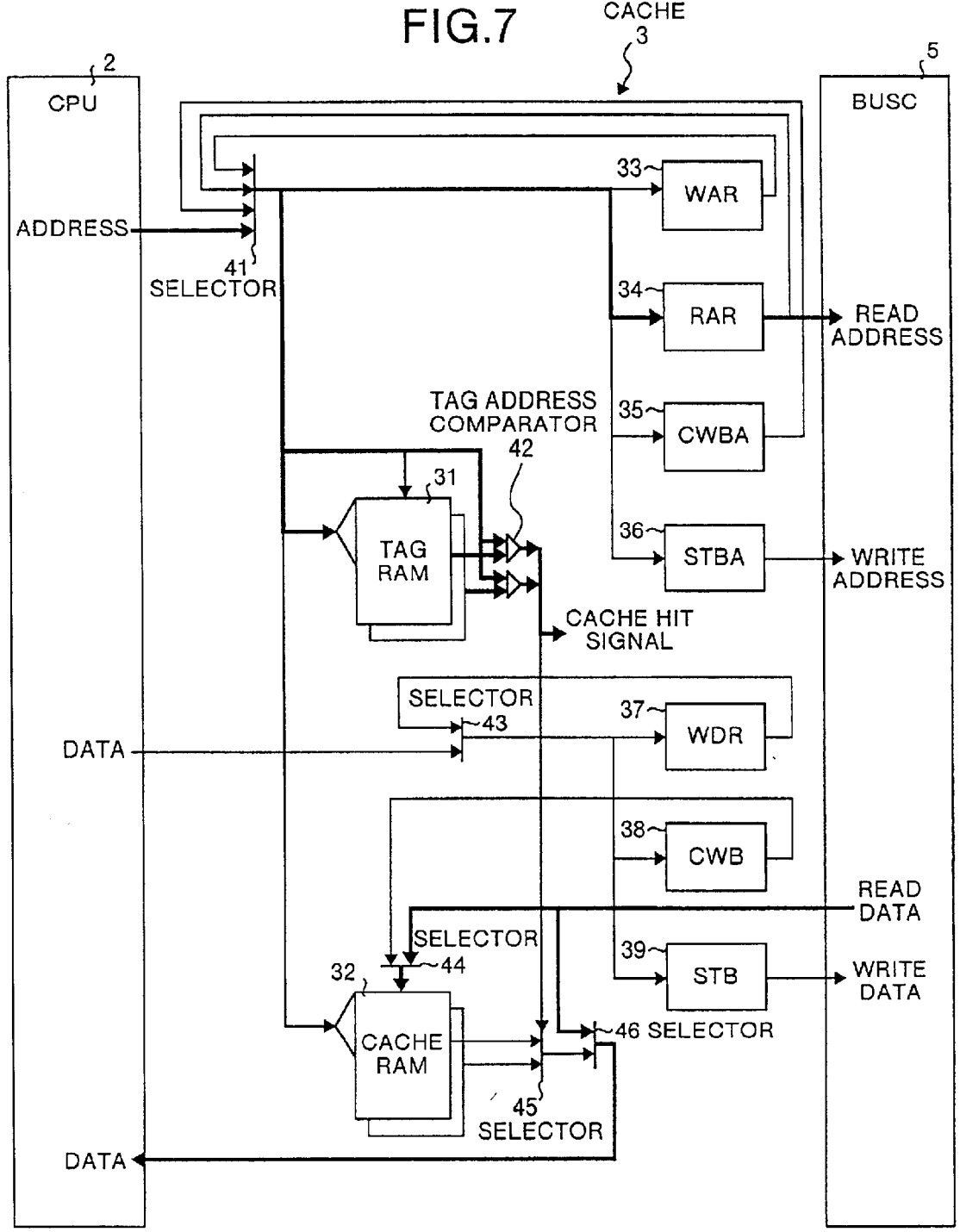
FIG. 7 is a diagram that shows the flow of an address and a read data when a read access has a cache miss in the microprocessor shown in FIG. 5.
Figure 8:
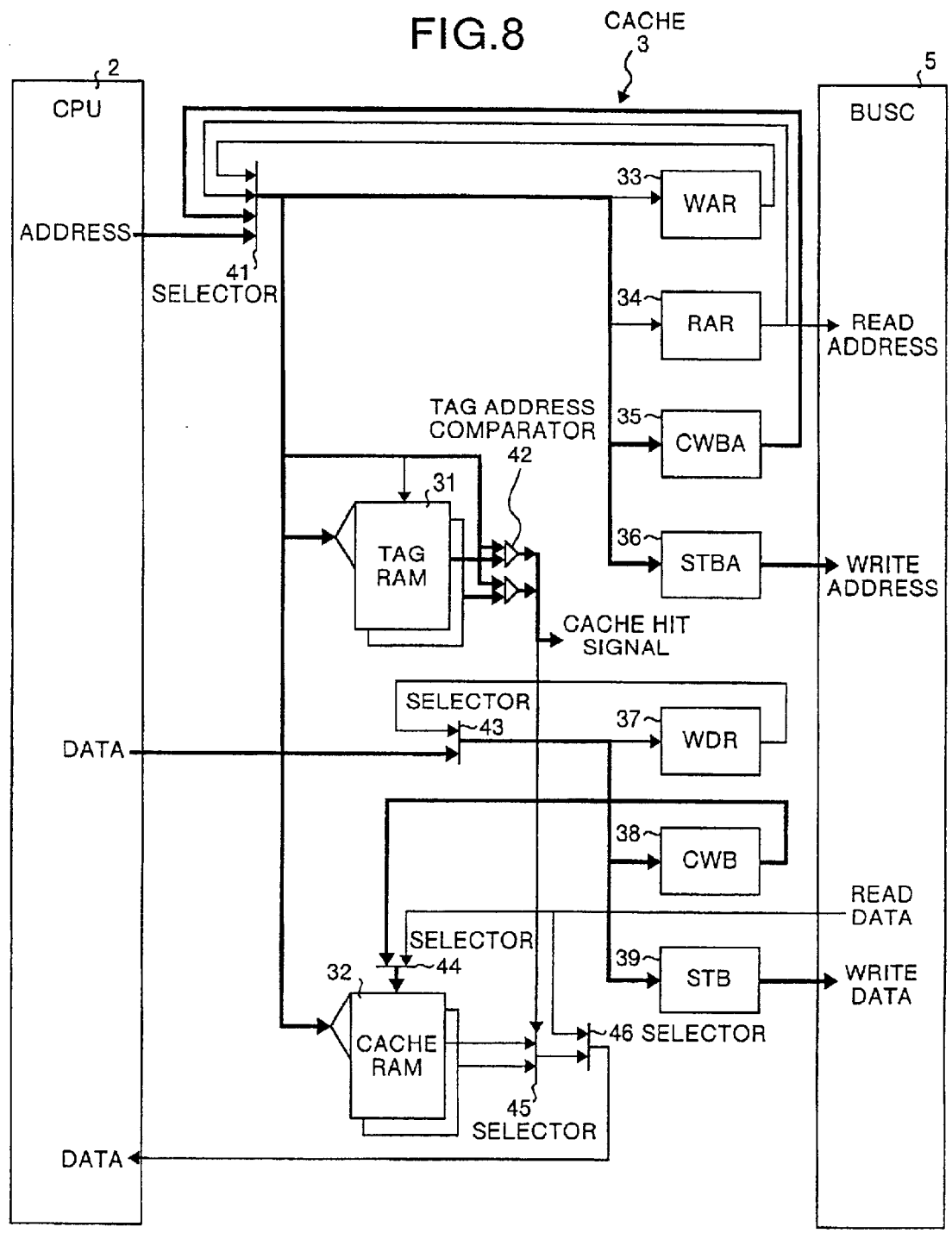
FIG. 8 is a diagram that shows the flow of the address and the read data when a write access has cache hit in the microprocessor shown in FIG. 5.
Figure 9:
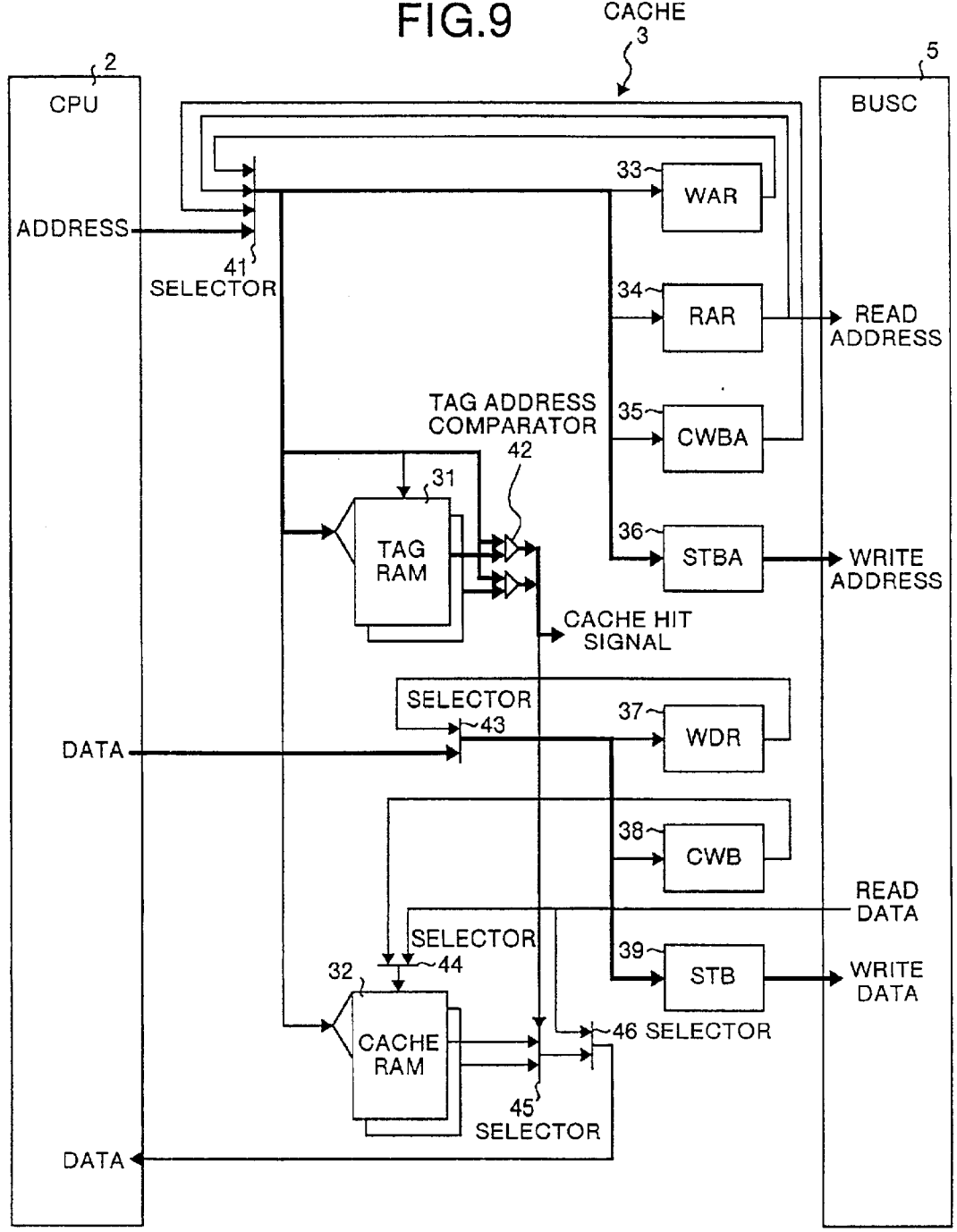
FIG. 9 is a diagram that shows the flow of the address and the read data when the write access has cache miss in the microprocessor shown in FIG. 5.
Figure 10:
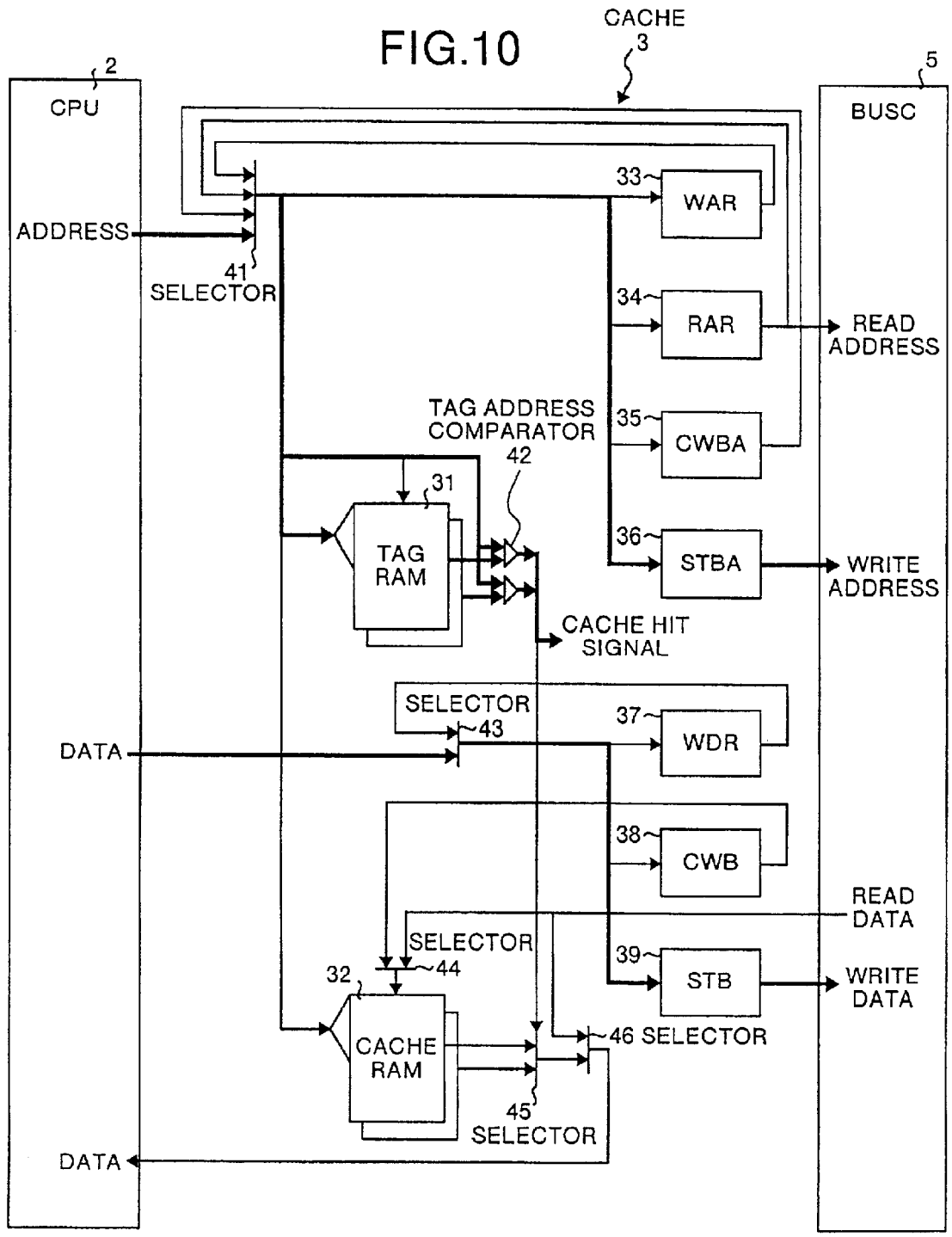
FIG. 10 is a diagram that shows flows of the address and the data when the read access occurs following the write access in the microprocessor shown in FIG. 5 (address dependency exists)
Figure 11:
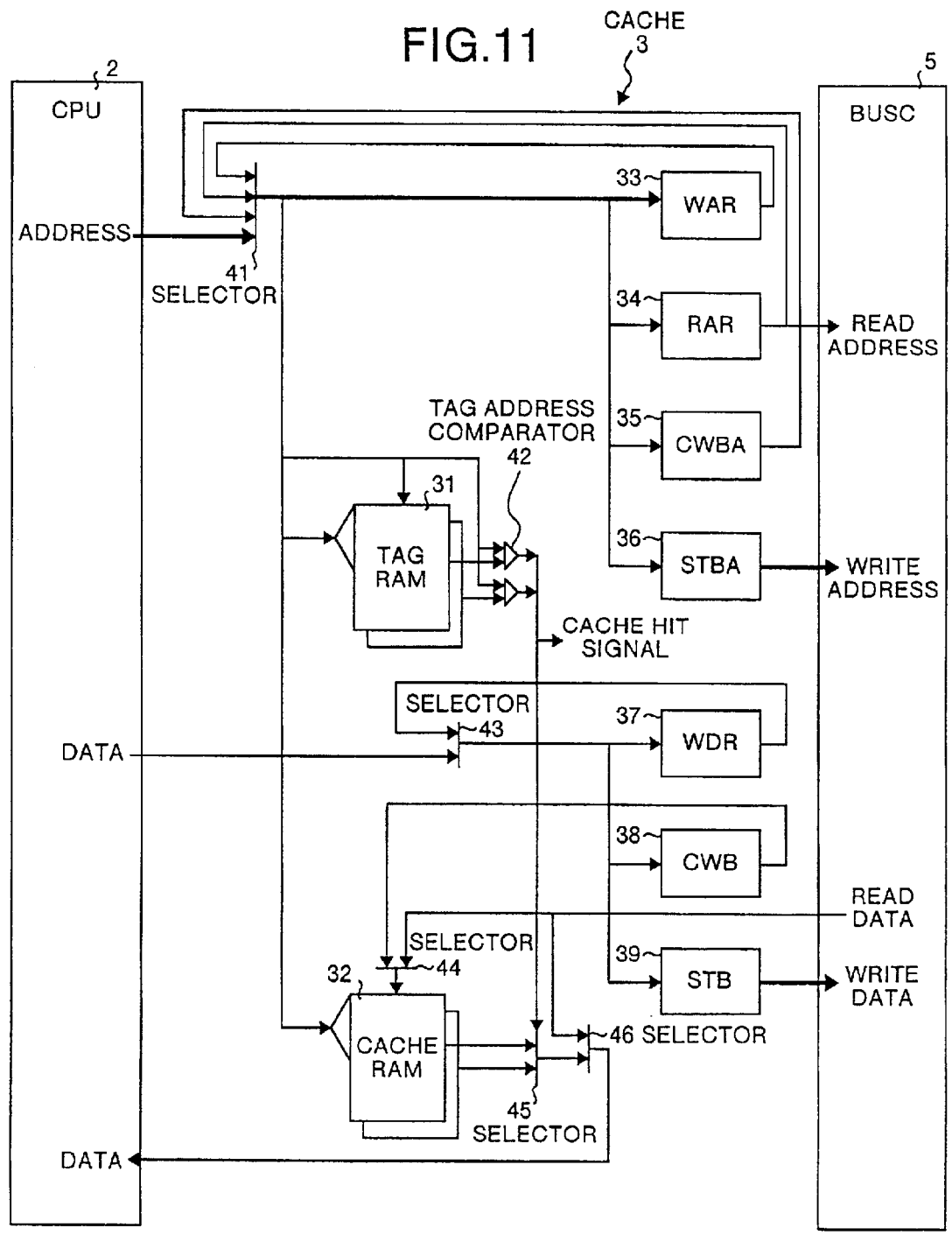
FIG. 11 is a diagram that shows the flows of the address and the data when the read access occurs following the write access in the microprocessor shown in FIG. 5 (address dependency exists)
Figure 12:
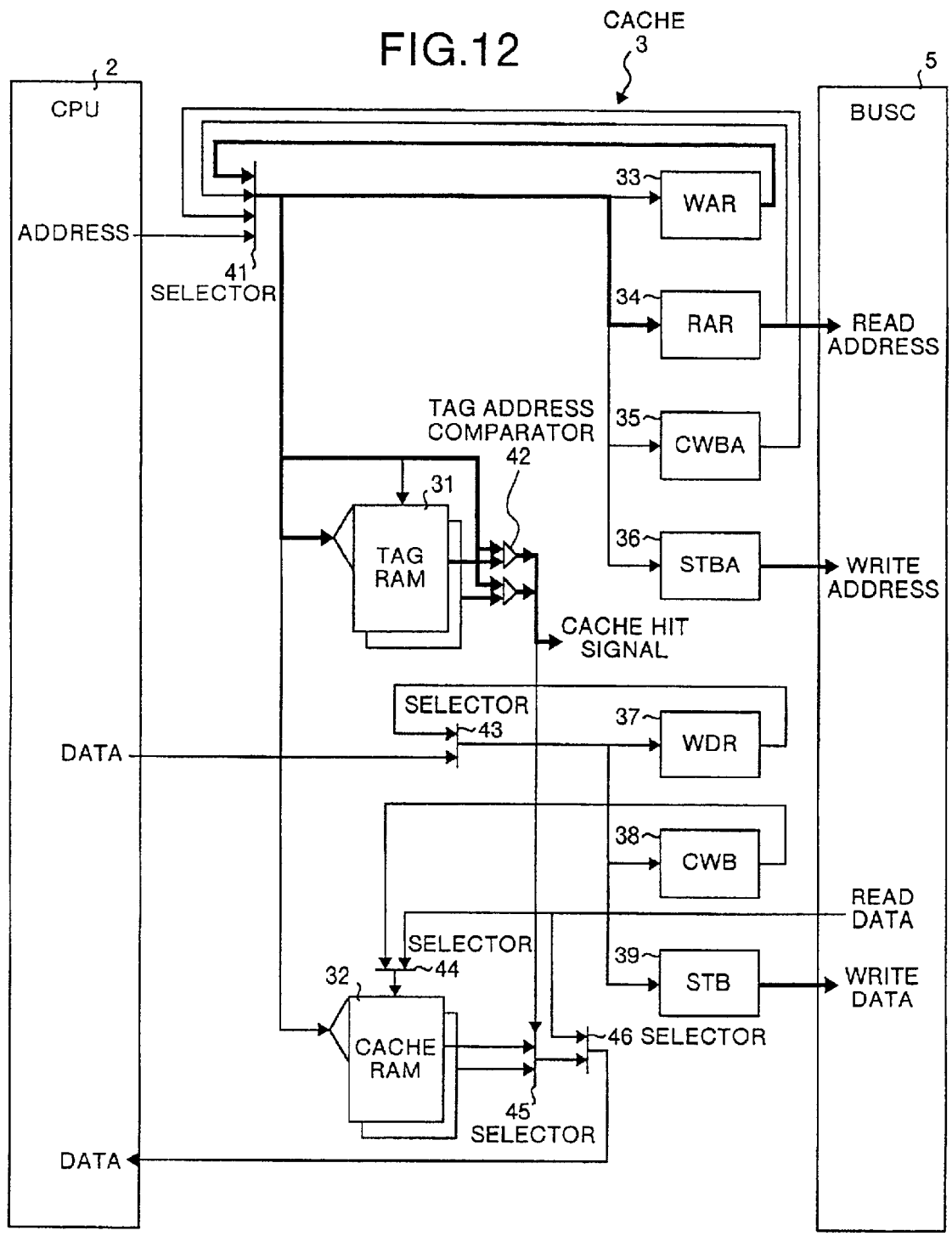
FIG. 12 is a diagram that shows the flows of the address and the data when the read access occurs following the write access in the microprocessor shown in FIG. 5 (address dependency exists)
Figure 13:
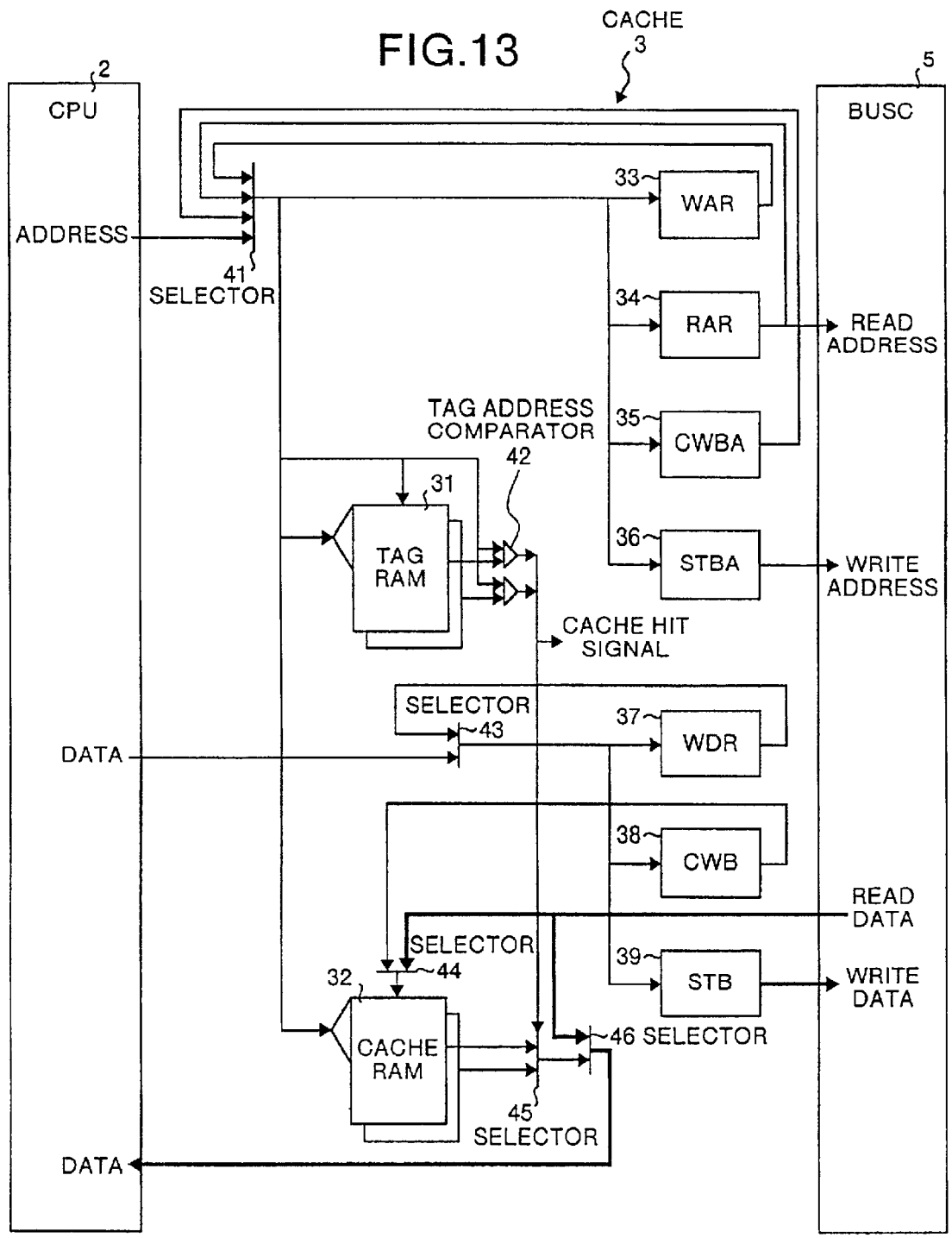
FIG. 13 is a diagram that shows the flows of the address and the data when the read access occurs following the write access in the microprocessor shown in FIG. 5 (address dependency exists)
Figure 14:
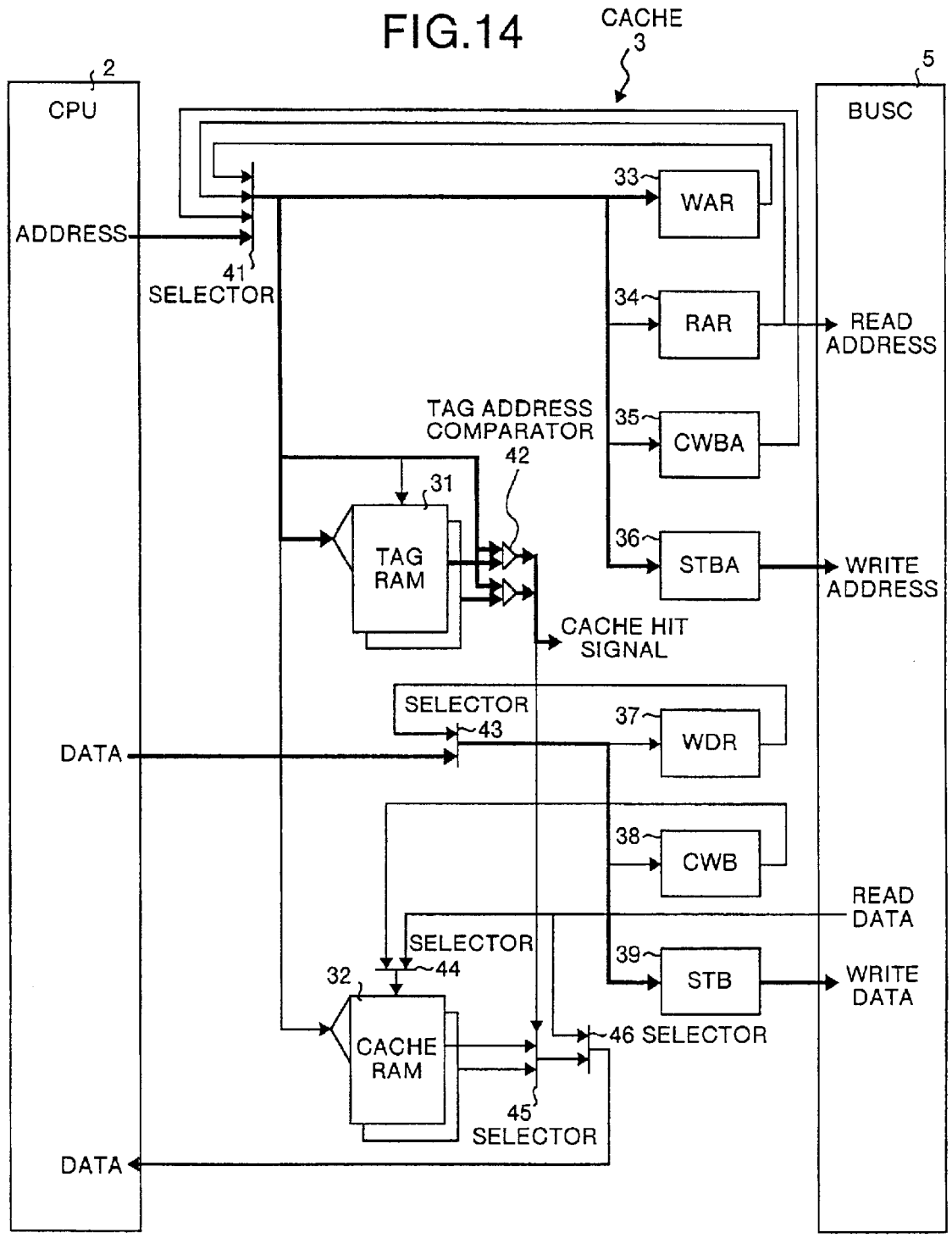
FIG. 14 is a diagram that shows the flows of the address and the data when the read access occurs following the write access in the microprocessor shown in FIG. 5 (address dependency does not exist)
Figure 15:
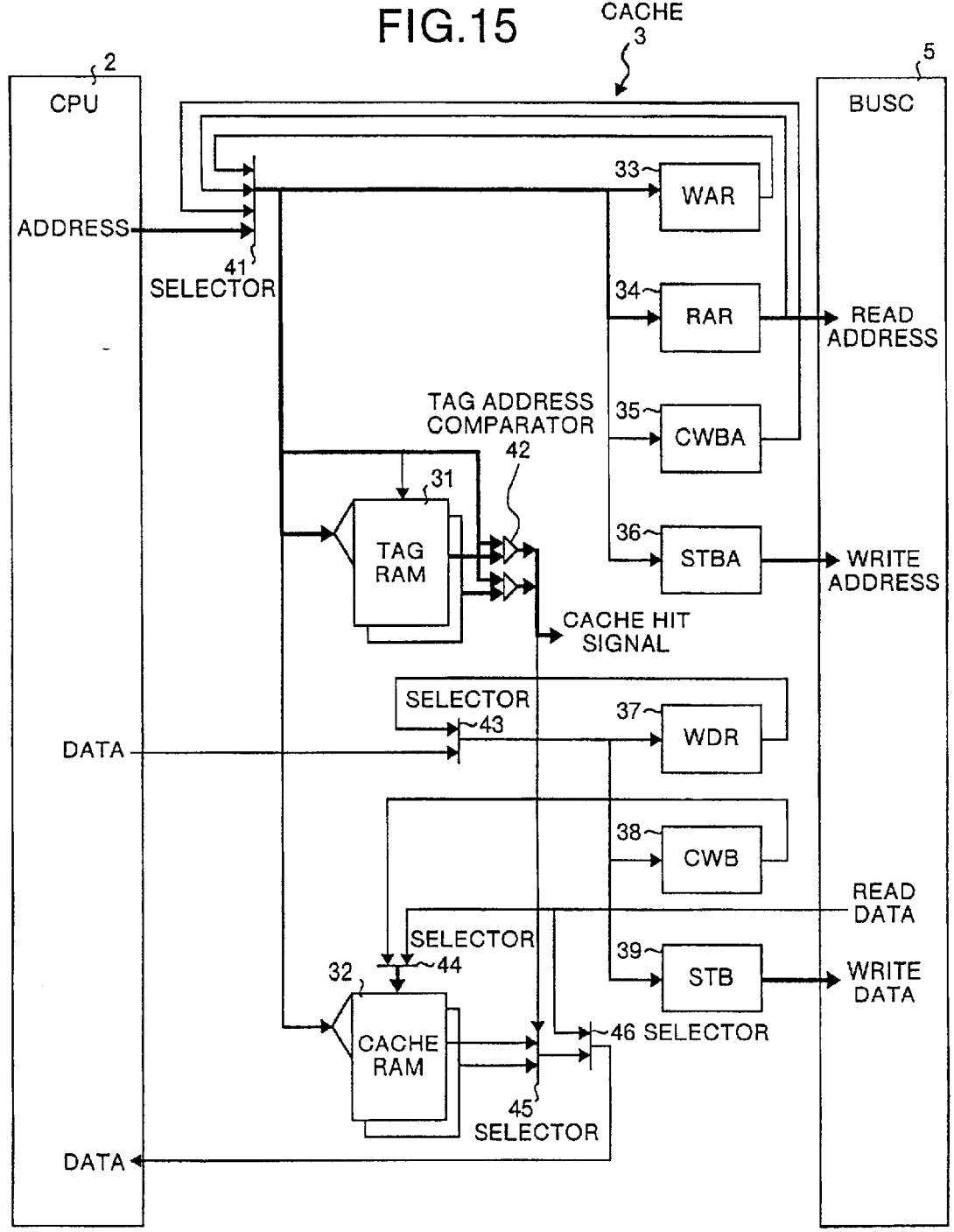
FIG. 15 is a diagram that shows the flows of the address and the data when the read access occurs following the write access in the microprocessor shown in FIG. 5 (address dependency does not exist)
Figure 16:
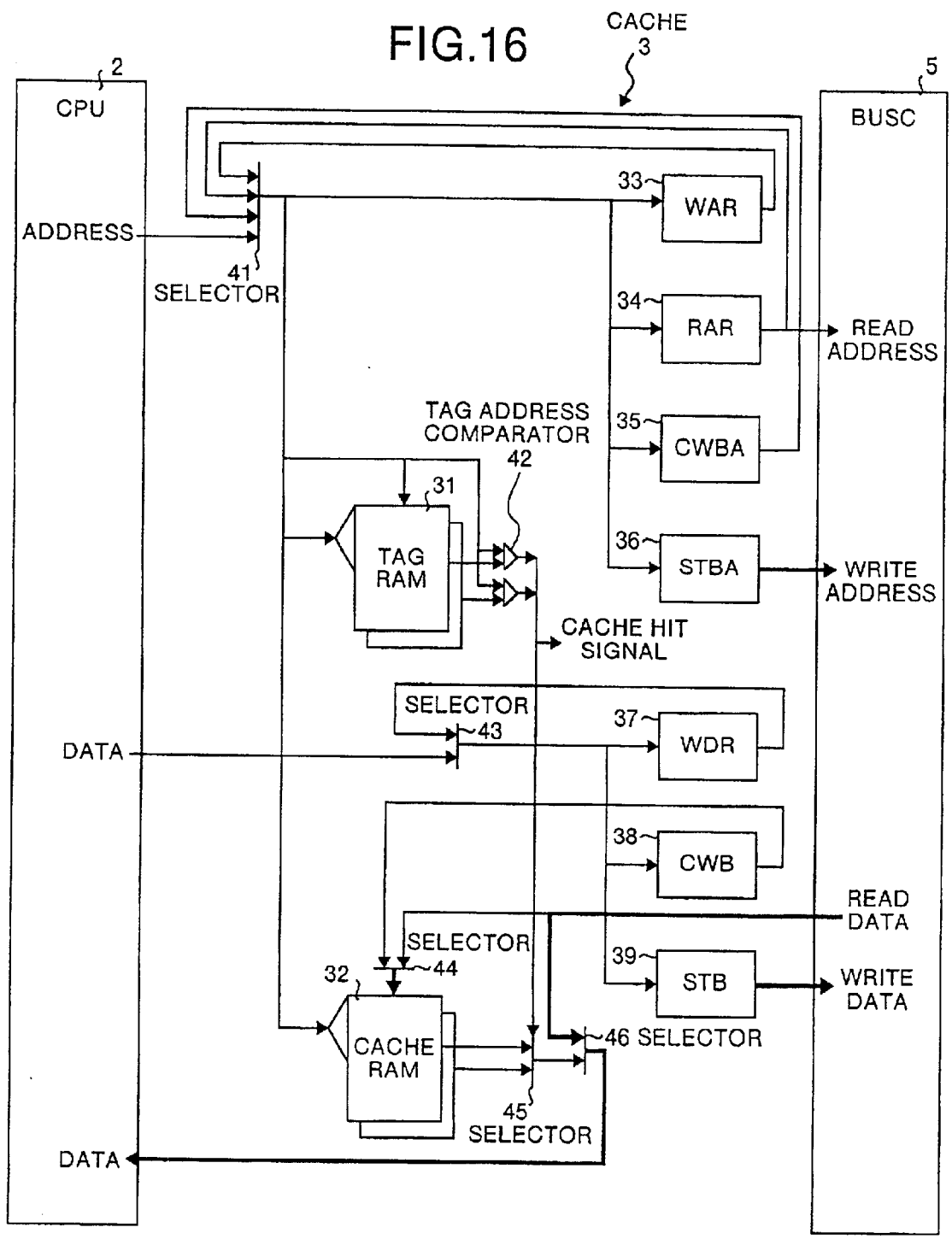
FIG. 16 is a diagram that shows the flows of the address and the data when the read access occurs following the write access in the microprocessor shown in FIG. 5 (address dependency does not exist)
Figure 17:
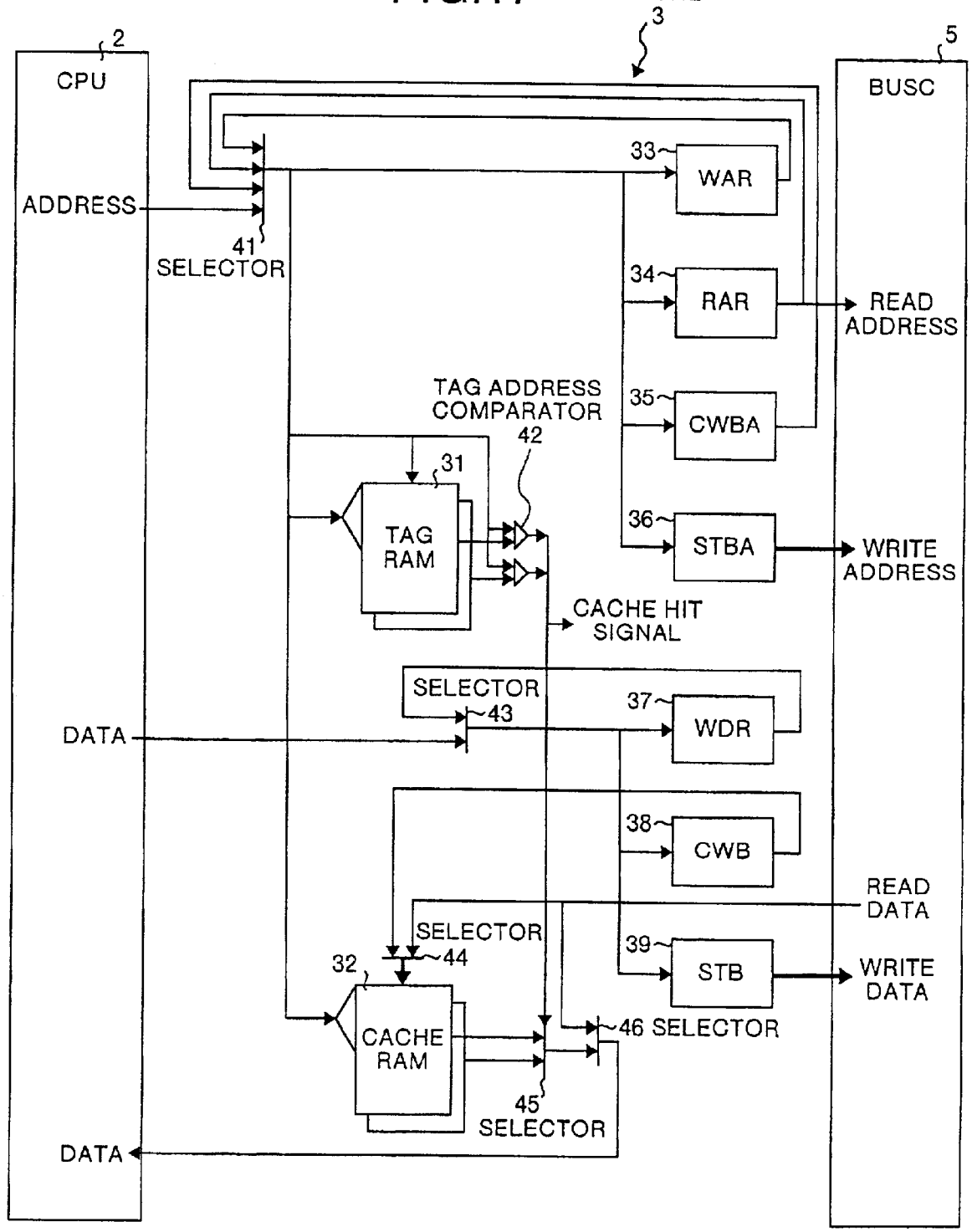
FIG. 17 is a diagram that shows the flows of the address and the data when the read access occurs following the write access in the microprocessor shown in FIG. 5 (address dependency does not exist)
Figure 19:
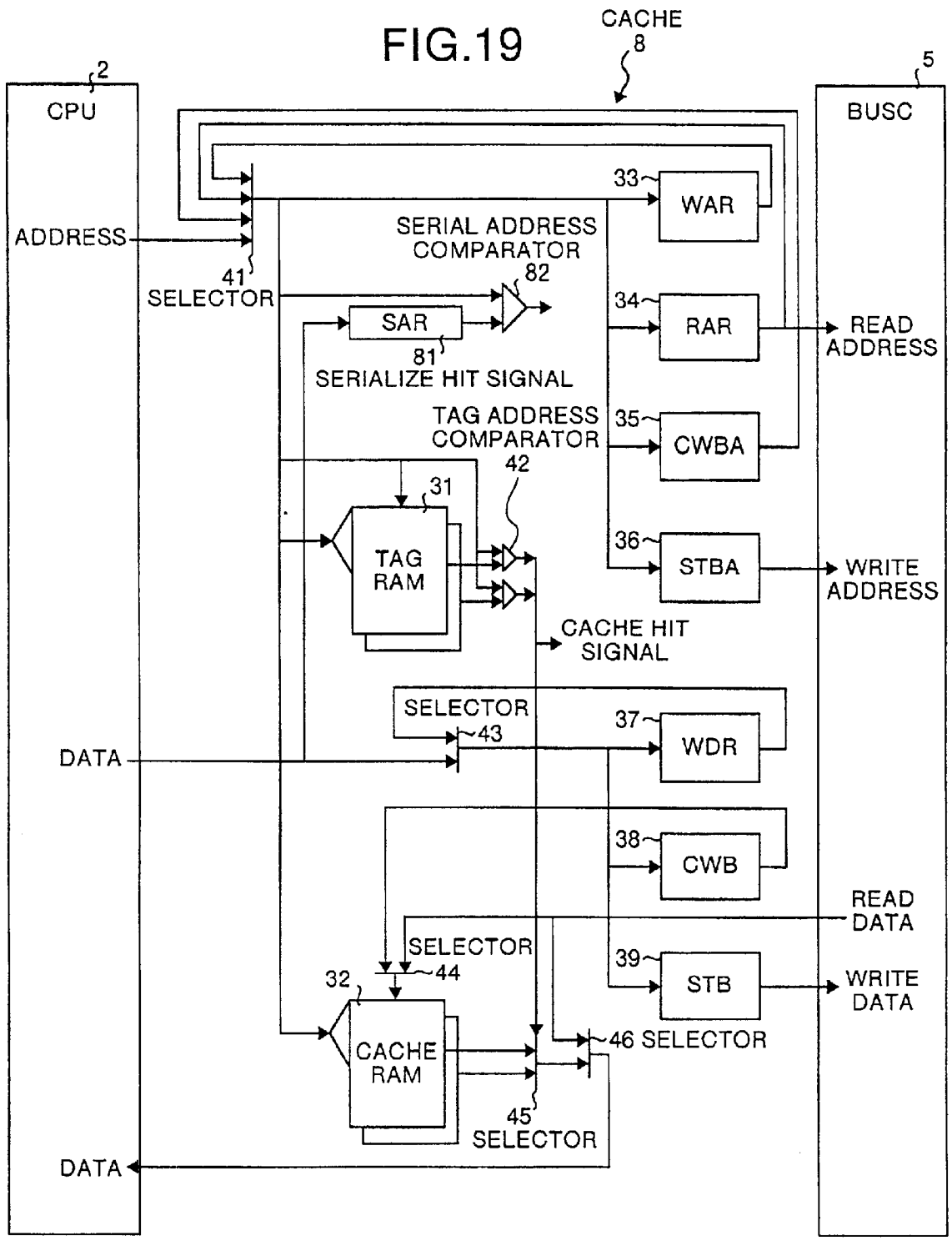
FIG. 19 is a block diagram that shows a detailed structure example of a cache system of a microprocessor, according to an aspect of the present invention.
Figure 20:
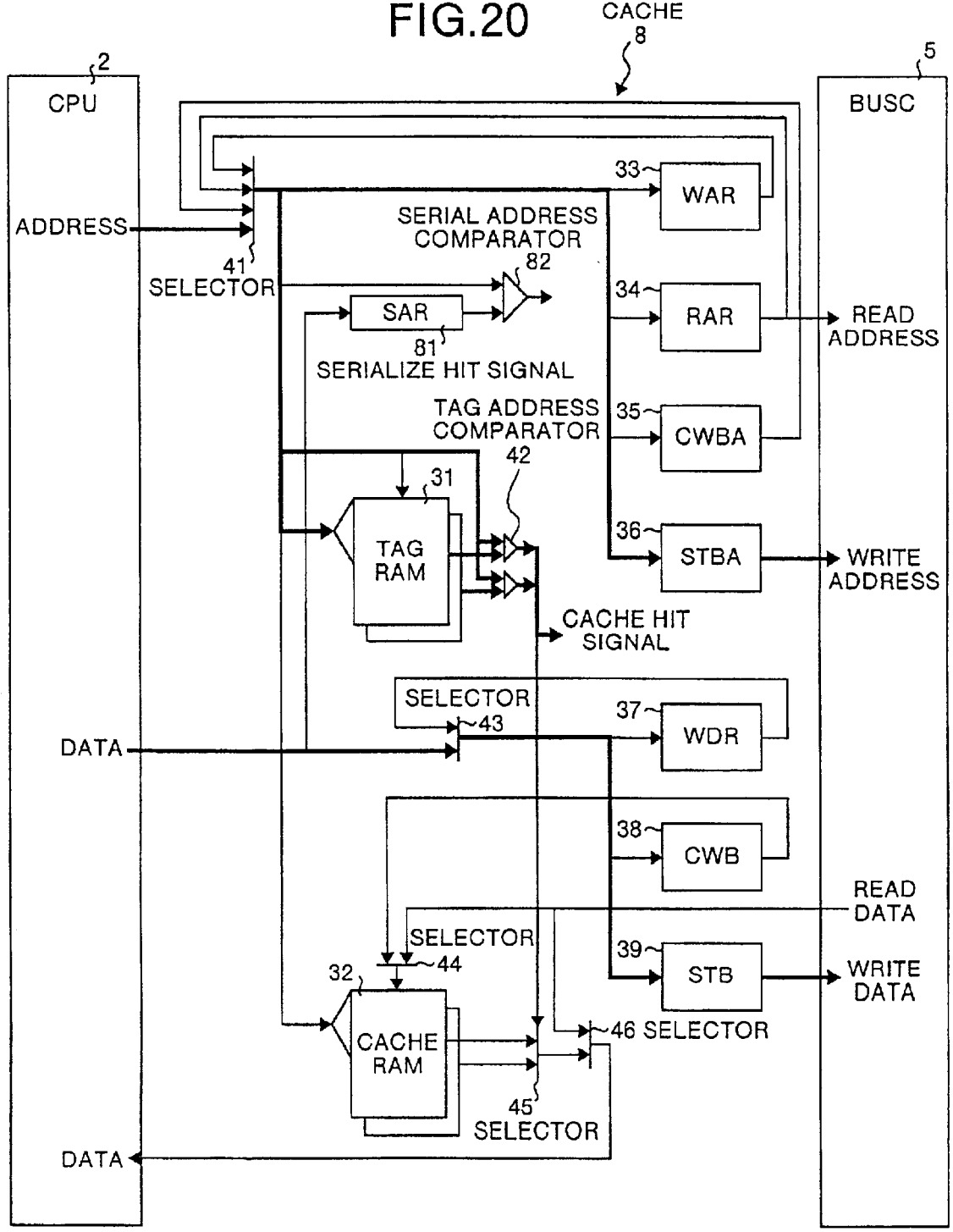
FIG. 20 is a diagram that shows the flows of the address and the data when the read access occurs following the write access in the microprocessor shown in FIG. 19 (address dependency does not exist), in accordance with an aspect of the present invention.

An embodiment of the present invention will be explained in detail below with reference to the accompanying drawings. FIG. 19 is a block diagram that shows a structure example of a cache system of a microprocessor, according to an aspect of the present invention. As show in FIG. 19, a cache system 8 has a serial address register ("SAR") 81, and a serial address comparator 82.

Further, the cache system 8 has a tag RAM 31, a cache RAM 32, a wait address register ("WAR") 33, a read address register ("RAR") 34, a cache write buffer address ("CWBA") 35, a store buffer address ("STBA") 36, a wait data register ("WDR") 37, a cache write buffer ("CWB") 38, and a store buffer (STB) 39. Further, the cache system 8 has five selectors 41, 43, 44, 45, and 46, and a tag address comparator 42. Further, the cache system 8 has a cache control section (not shown) that controls the cache system 8.

The serial address register 81 is a register, which stores an address that requires an access order. For example, when the CPU 2 writes a value of the address that requires the access order as data into the serial address register 81, this address is stored into the serial address register 81.

The serial address comparator 82 compares the address selected by the selector 41, to be described later, with the address stored in the serial address register 81. When the addresses coincide with each other, a serialize hit signal supplied to a cache control section (not shown) is asserted. When the serialize hit signal has been asserted, the cache control section (not shown) carries out a control to guarantee the access order. When the addresses do not coincide with each other, as a result of the comparison by the serial address comparator 82, the serialize hit signal is negated. In this case, the access order is not guaranteed.

The wait address register 33 is a register, which stores the address when the execution is waited for some reason. The read address register 34 is a register, which stores a read address to the buffer control section 5. The cache write buffer address 35 is a register, which stores a write address to the cache system 8.

The store buffer address 36 is a register, which stores the write address to the bus control section 5. The wait data register 37 is a register, which stores the data when the execution is waited for some reason. The cache write buffer 38 is a register, which stores a write data to the cache system 8. The store buffer 39 is a register, which stores the write data to the bus control section 5.

The first register 41 selects one of the address supplied from the CPU 2, the address stored in the wait address register 33, the address stored in the read address register 34, and the address stored in the cache write buffer address 35. The address selected by the selector 41 is supplied to the wait address register 33, read address register 34, cache write buffer address 35, or the store buffer address 36. At the same time, the selected address is also supplied to the tag RAM 31, the cache RAM 32, and the tag address comparator 42.

The tag address comparator 42 has comparators. Each comparator compares the address selected by the selector 41 with the address stored in the tag RAM 31 of each way. When the addresses coincide with each other, as a result of this comparison, a cache hit signal supplied to the cache control section (not shown) is asserted. When the addresses do not coincide with each other, the cache hit signal is negated.

The second register 43 selects one of the data supplied from the CPU 2 and the data stored in the wait data register 37. The data selected by the selector 43 is supplied to the wait data register 37, the cache write buffer 38, or the store buffer 39.

The third selector 44 selects one of the read data supplied from the bus control section 5 and the data stored in the cache write buffer 38. The data selected by the selector 44 is supplied to the cache RAM 32.

The fourth selector 45 selects the output data from the cache RAM 32 of any one way, based on a result of the comparison by the tag address comparator 42. The fifth selector 46 selects one of the data selected by the fourth selector 45 and the read data supplied from the bus control section 5. The data selected by the fifth selector 46 is supplied to the CPU 2.

Next, the operation of an occasion in which there is no address dependency between write and read when a read access occurs following a write access in the microprocessor shown in FIG. 19, will be explained. FIG. 20 to FIG. 23 are diagrams that sequentially show flows of the address and the data in this case. The address that requires access order is stored in advance in the serial address register 81.

The CPU 2 makes a write request to the cache system 8, and outputs the write address. This write address is supplied to the tag RAM 31 and the tag address comparator 42 via the first selector 41. The tag address comparator 42 compares a tag address with the write address, and when there is a cache miss as a result of this comparison, the write address is stored into the store buffer address 36. Further, a write data supplied from the CPU 2 is stored into the store buffer 39 via the second selector 43. Then, the write request is output to the bus control section 5 (refer to FIG. 20).

The CPU 2 makes a read request to the cache system 8, and outputs the read address. This read address is supplied to serial address comparator 82. The serial address comparator 82 compares the read address with the address stored in the serial address register 81. When the addresses coincide with each other as a result of the comparison, the read address is stored into the wait address register 33. The read address is stored in the wait address register 33 until when the preceding write request is accepted by the bus control section 5 and the operation is completed (refer to FIG. 21). The cache system 8 does not accept requests from the CPU 2 thereafter.

When the preceding write request is completed, the succeeding read request is executed again. When a cache miss occurs as a result of the comparison of the addresses by the tag address comparator 42, the read address is stored into the read address register 34. The read request and the address are output to the bus control section 5 (refer to FIG. 22). The bus control section 5 accepts the read request, and returns the requested data to the cache system 8. The returned data is output from the cache system 8 to the CPU 2 (refer to FIG. 23).

The operations of an occasion in which there is cache hit in the write access, an occasion in which there is cache hit in the read access, and an occasion in which there is address dependency between write and read, are similar to the operations in the conventional cases. Therefore, their explanation will be omitted.

According to an aspect of the present embodiment, the microprocessor is provided with the serial address register 81 and the serial address comparator 82. The serial address register 81 stores the address that requires a guarantee of an access order, and the serial address comparator 82 compares an address supplied from the CPU 2 with the address stored in the serial address register 81. When these addresses coincide with each other, the succeeding access request becomes in a wait status until when the bus control section 5 accepts the preceding access request and has completed the operation. Therefore, it is possible to guarantee the access order to the access request that requires a guarantee of the access order. Consequently, it becomes possible to guarantee the access order in hardware. As a result, a programmer can carry out programming efficiently without considering a limitation of the access order or the like.

It is needless to mention that the present invention is not limited to the embodiment explained above, and it is also possible to modify the embodiment in various ways. For example, there may be provided a structure having a plurality of the serial address registers 81. Based on this arrangement, it becomes possible to guarantee the access order to a plurality of addresses. Further, there may be also provided a structure in which the serial address register 81 can set a size of an address area that requires a guarantee of an order. Further, the value stored in the serial address registers 81 may be a pre-set fixed value. When the value stored in the serial address registers 81 is fixed, the control of the cache system 8 becomes easy.

According to an aspect of the present invention, the address supplied from the CPU 2 is compared with the address that requires a guarantee of the access order. When these addresses coincide with each other, a preceding access request is executed first, and a succeeding access request is executed after the preceding access request has been executed. Therefore, it is possible to guarantee the access order to the access request that requires a guarantee of the access order. Consequently, it becomes possible to guarantee the access order in hardware. As a result, a programmer can carry out programming efficiently without considering a limitation of the access order or the like.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A microprocessor, comprising:

a register storing an address area, the address area requiring a guarantee of an access order; and a comparator comparing an address of the address area held in said register with an address of an address area indicated in an access request from a CPU, and outputting a signal to execute an access request succeeding the access request from the CPU after executing an access request preceding the access request from the CPU when the address area indicated in the access request from the CPU matches the address area held in said register.

2. The microprocessor according to claim 1, wherein a size of the address area stored in said register is fixed.

3. The microprocessor according to claim 2, wherein a size of the address area stored in said register is set based on the required guarantee of the access order.

4. The microprocessor according to claim 3, wherein the address area stored in said register comprises a plurality of addresses requiring the guarantee of the access order.

5. The microprocessor according to claim 2, wherein the address area stored in said register comprises a plurality of addresses requiring the guarantee of the access order.

6. The microprocessor according to claim 1, wherein a size of the address area stored in said register is set based on the required guarantee of the access order.

7. The microprocessor according to claim 6, wherein the address area in said register comprises a plurality of addresses requiring the guarantee of the access order.

8. The microprocessor according to claim 1, wherein the address area stored in said register comprises a plurality of addresses requiring the guarantee of the access order.

* * * * *

UNITED STATES PATENT AND TRADEMARK OFFICE
CERTIFICATE OF CORRECTION

PATENT NO. : 6,823,406 B2
DATED : November 23, 2004
INVENTOR(S) : Hitoshi Yoda et al.

It is certified that error appears in the above-identified patent and that said Letters Patent is hereby corrected as shown below:

<u>Title page,</u>
Item [57], ABSTRACT,
Line 6, after "from" insert -- a --.

<u>Column 10,</u>
Line 16, after "area" insert -- stored --.

Signed and Sealed this

Twenty-fourth Day of January, 2006

JON W. DUDAS
*Director of the United States Patent and Trademark Office*